(12) United States Patent
Limvorapun

(10) Patent No.: US 10,826,136 B2
(45) Date of Patent: Nov. 3, 2020

(54) BATTERY PACK INCLUDING STACKED BATTERY-BOARD ASSEMBLIES

(71) Applicant: The Boeing Company, Chicago, IL (US)

(72) Inventor: Suhat Limvorapun, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1221 days.

(21) Appl. No.: 14/340,434

(22) Filed: Jul. 24, 2014

(65) Prior Publication Data

US 2016/0028128 A1 Jan. 28, 2016

(51) Int. Cl.

| | |
|---|---|
| *H01M 10/42* | (2006.01) |
| *H01M 10/625* | (2014.01) |
| *H01M 10/6571* | (2014.01) |
| *H01M 10/615* | (2014.01) |
| *H01M 10/48* | (2006.01) |
| *H02J 7/00* | (2006.01) |
| *H01M 2/20* | (2006.01) |
| *B64G 1/42* | (2006.01) |
| *H01M 10/6555* | (2014.01) |
| *H01M 2/10* | (2006.01) |
| *H01M 10/647* | (2014.01) |

(52) U.S. Cl.
CPC ........ *H01M 10/4257* (2013.01); *B64G 1/425* (2013.01); *H01M 2/1077* (2013.01); *H01M 2/206* (2013.01); *H01M 10/425* (2013.01); *H01M 10/482* (2013.01); *H01M 10/615* (2015.04); *H01M 10/625* (2015.04); *H01M 10/647* (2015.04); *H01M 10/6555* (2015.04); *H01M 10/6571* (2015.04); *H02J 7/0016* (2013.01); *H01M 10/486* (2013.01); *H01M 2010/4271* (2013.01); *H01M 2220/20* (2013.01)

(58) Field of Classification Search
CPC .......................... H01M 10/4257; H01M 10/60
USPC ......................................................... 429/120
See application file for complete search history.

(56) References Cited

U.S. PATENT DOCUMENTS

| | | |
|---|---|---|
| 3,992,225 A | 11/1976 | Sykes |
| 7,667,432 B2 | 2/2010 | West et al. |
| 7,843,170 B2 | 11/2010 | Anupindi et al. |

(Continued)

FOREIGN PATENT DOCUMENTS

| | | |
|---|---|---|
| CN | 202487677 U | 10/2012 |
| CN | 103152982 A | 6/2013 |

(Continued)

OTHER PUBLICATIONS

No title, http://spot4.cnes.fr/spot4_gb/alim.htm.

(Continued)

*Primary Examiner* — James Lee
(74) *Attorney, Agent, or Firm* — Miller, Matthias & Hull LLP

(57) ABSTRACT

A battery pack comprises a stack of battery-board assemblies. Each battery-board assembly includes a circuit board, an electrical connector mounted on the circuit board, and a battery cell secured to a side of the circuit board. The battery cells are sandwiched between the circuit boards and the connectors are interconnected. The circuit boards and the connectors electrically connect the battery cells together.

20 Claims, 9 Drawing Sheets

(56) References Cited

U.S. PATENT DOCUMENTS

| | | |
|---|---|---|
| 7,914,924 B2 | 3/2011 | Sugeno et al. |
| 8,299,801 B2 | 10/2012 | Yano et al. |
| 2004/0009334 A1* | 1/2004 | Miyamoto ............. H01M 2/26 428/209 |
| 2006/0022646 A1 | 2/2006 | Moore et al. |
| 2008/0213652 A1* | 9/2008 | Scheucher ............... B60L 8/00 429/62 |
| 2010/0104927 A1 | 4/2010 | Albright |
| 2011/0048781 A1* | 3/2011 | Neudecker ............. H01M 6/40 174/260 |
| 2012/0028097 A1* | 2/2012 | Oury ................... H01M 10/647 429/120 |
| 2012/0301747 A1 | 11/2012 | Han et al. |
| 2013/0011700 A1 | 1/2013 | Park et al. |
| 2013/0069594 A1* | 3/2013 | Jung ................. H01M 10/425 320/112 |
| 2013/0196205 A1 | 8/2013 | Silk et al. |
| 2014/0160715 A1* | 6/2014 | Wacker .................. H01M 2/30 361/810 |
| 2015/0104683 A1* | 4/2015 | Lundstrom ....... H01M 10/0413 429/61 |

FOREIGN PATENT DOCUMENTS

| | | |
|---|---|---|
| EP | 2437329 A1 | 4/2012 |
| EP | 2579382 A2 | 4/2013 |
| EP | 2579382 A2 | 10/2013 |
| JP | 2012119295 A | 6/2012 |
| KR | 2013 0025329 A | 3/2013 |
| RU | 2336600 C1 | 10/2008 |
| WO | 2012153239 A1 | 11/2012 |
| WO | WO-2013147659 A1 * 10/2013 ........ H01M 10/0413 |
| WO | 2012053426 A1 | 2/2014 |

OTHER PUBLICATIONS

Office Action for related European Application No. EP15169242.3; report dated Nov. 30, 2017.

Office Action for related Russian Application No. RU 2015118944/07; dated Dec. 19, 2018.

Office Action for related Japanese Application No. 2015-106211; report dated May 20, 2019.

* cited by examiner

BATTERY PACK INCLUDING STACKED BATTERY-BOARD ASSEMBLIES

BACKGROUND

A battery pack may include a stack of battery cells connected in serial and/or parallel configurations. Terminals of the battery cells may connected by bus bars or other conductors. If a battery pack is intended for a high vibration environment, the battery cells may be secured in a battery case with potting compound, and the conductors may be soldered or welded to the terminals to ensure connectivity.

Eventually, a battery cell may have to be replaced. To replace a battery cell, its terminals are unsoldered, and the battery cell is freed from the potting compound and removed from the battery case. Surfaces are cleaned of old potting compound, and a replacement battery cell is inserted into the case. New compound is added, and conductors are resoldered to terminals of the replacement battery cell.

Removing the battery cell from the potting compound, without damaging adjacent battery cells, is difficult and time consuming. Unsoldering and resoldering of terminals is also difficult and time consuming.

SUMMARY

According to an embodiment herein, a battery pack comprises a stack of battery-board assemblies. Each battery-board assembly includes a circuit board, an electrical connector mounted on the circuit board, and a battery cell secured to a side of the circuit board. The battery cells are sandwiched between the circuit boards and the connectors are interconnected. The circuit boards and the connectors electrically connect the battery cells together.

According to another embodiment herein, a battery pack comprises a stack of a plurality of battery-board assemblies and a control board. Each battery-board assembly includes a circuit board, a battery cell on the circuit board, at least one heating element proximate the battery cell, and an electrical connector on the circuit board. The control board includes a circuit board and maintenance circuitry. The battery cells are sandwiched between the circuit boards and the electrical connectors are clamped together. The circuit boards and the connectors connect the battery cells in a serial configuration. Traces on the circuit boards and pins of the connectors form communication lines that enable the maintenance circuitry to communicate with each battery-board assembly.

According to another embodiment herein, a satellite comprises a power subsystem including a battery pack. The battery pack includes a stack of battery-board assemblies. Each battery-board assembly includes a circuit board, an electrical connector mounted on the circuit board, and a lithium ion battery cell secured to a side of the circuit board. The battery cells are sandwiched between the circuit boards. Traces on the circuit boards and pins of the connectors electrically connect the battery cells together in a serial configuration.

These features and functions may be achieved independently in various embodiments or may be combined in other embodiments. Further details of the embodiments can be seen with reference to the following description and drawings.

DETAILED DESCRIPTION

Figure 1:
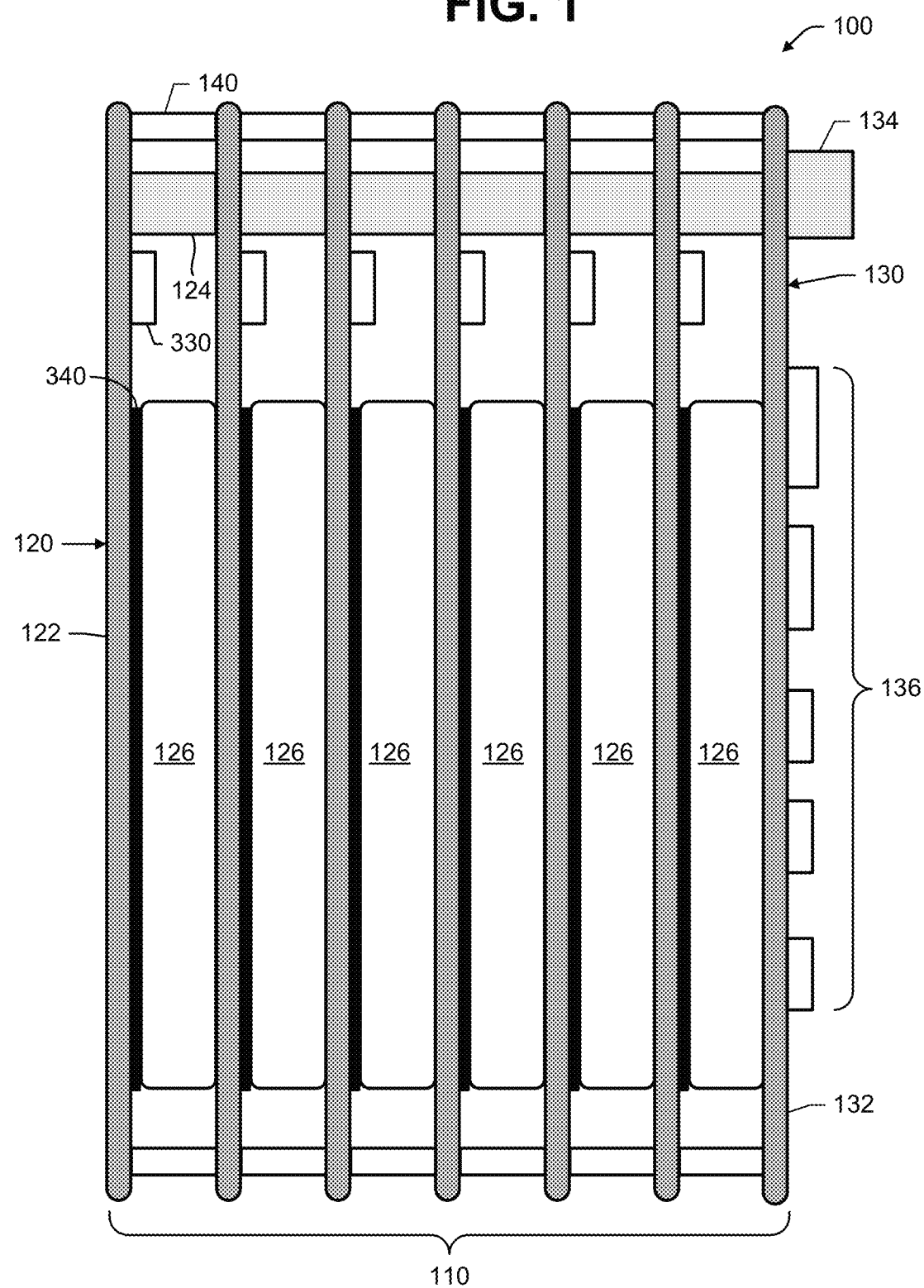
FIG. 1 is an illustration of a battery pack.

Reference is made to FIG. 1, which illustrates a battery pack 100 including a stack 110 of a plurality of battery-board assemblies 120 and a control board 130. Each battery-board assembly 120 includes a circuit board 122, an electrical connector 124 mounted on the circuit board 122, and a flat battery cell 126 secured to a side of the circuit board 122.

The control board 130 includes a circuit board 132 and a connector 134 mounted on the circuit board 132, but does not include a battery cell. The control board 130 also includes maintenance circuitry 136 electrically connected to the connector 134. The maintenance circuitry 136 may be configured to perform various functions such as monitoring the battery cells 126, heating the battery cells 126, and load balancing of the battery cells 126. The maintenance circuitry 136 may include a processor that is programmed to perform these various functions.

The battery-board assemblies 120 and the control board 130 are stacked together with the battery cells 126 sandwiched between the circuit boards 122 and 132. The battery cells 126 may be clamped between the circuit boards 122 and 132, where the battery cells 126 are placed under slight compression or no compression.

The circuit boards 122 and 132 may be mounted to, and separated by, a frame 140. For example, the frame 140 may include spacers or stanchions. As the circuit boards 122 and 132 are stacked and fastened to the frame 140, the connectors 124 and 134 are clamped together to ensure connectivity.

Traces on the circuit boards 122 and pins of the connectors 124 of the battery-board assemblies 120 connect the battery cells 126 in a serial and/or parallel configuration. The connector 134 of the control board 130 may provide terminals of the battery pack 100.

Traces on the circuit boards 122 and pins of the connectors 124 of the battery-board assemblies 120 form communication lines, such as sense lines and control lines. The maintenance circuitry 136 on the control board 130 is connected to these communication lines via traces on the circuit board 132. These communication lines enable the maintenance circuitry 136 to communicate with each battery-board assembly 120.

The electrical connectors 124 and 134 may be surface mount design (SMD) connectors. For example in FIG. 1, the connector 124 of the leftmost battery-board assembly 120 may be a male SMD connector, the connectors 124 of the other battery-board assemblies 120 may be male-female SMD connectors, and the connector 134 of the control board 130 may be a female SMD connector.

Figure 2:
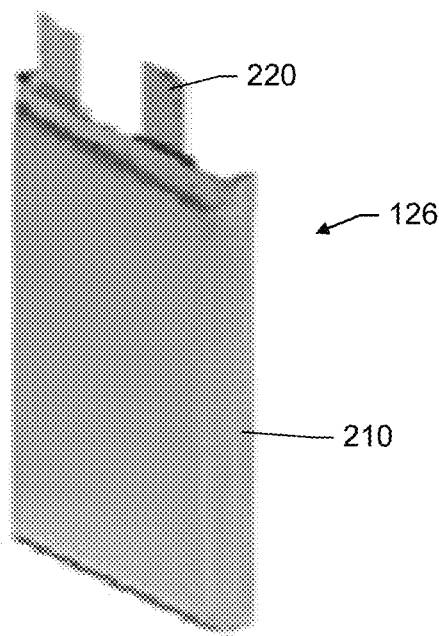
FIG. 2 is an illustration of a battery cell.

Reference is made to FIG. 2, which illustrates an example of a flat battery cell 126 known as a pouch cell. The battery cell 126 is not limited to any particular chemistry. Lithium-ion (Li-ion) batteries (LIBs) are desirable for certain applications. LIBs have lower weight and higher energy density than rechargeable batteries such as nickel metal hydride and nickel cadmium batteries. They have no memory degradation.

The battery cell 126 includes a pouch 210, which may be made of a non-metallic material. The circuit boards 122 and 132 protect the battery cells 126 against physical damage such as punctures.

Battery cell terminals 220 extend outward from the pouch 210. Although the terminals 220 are not limited to any particular configuration, terminals configured as tabs can be mounted to the circuit board 122 of FIG. 3A.

The battery cell 126 of FIG. 2 is shown with a relatively prismatic geometry. However, the battery cell 126 is not so limited. The battery cell 126 may have a different geometry, such as a cylindrical geometry.

Although the battery cell 126 of FIG. 2 is shown as being relatively flat, the battery cell 126 is not so limited. For example, the battery cell 126 may have non-planar surfaces. The circuit board 122 may be configured to hold such a battery cell 126, or a battery holder may be used to hold such a battery cell 126 between the circuit boards 122.

Figure 3B:
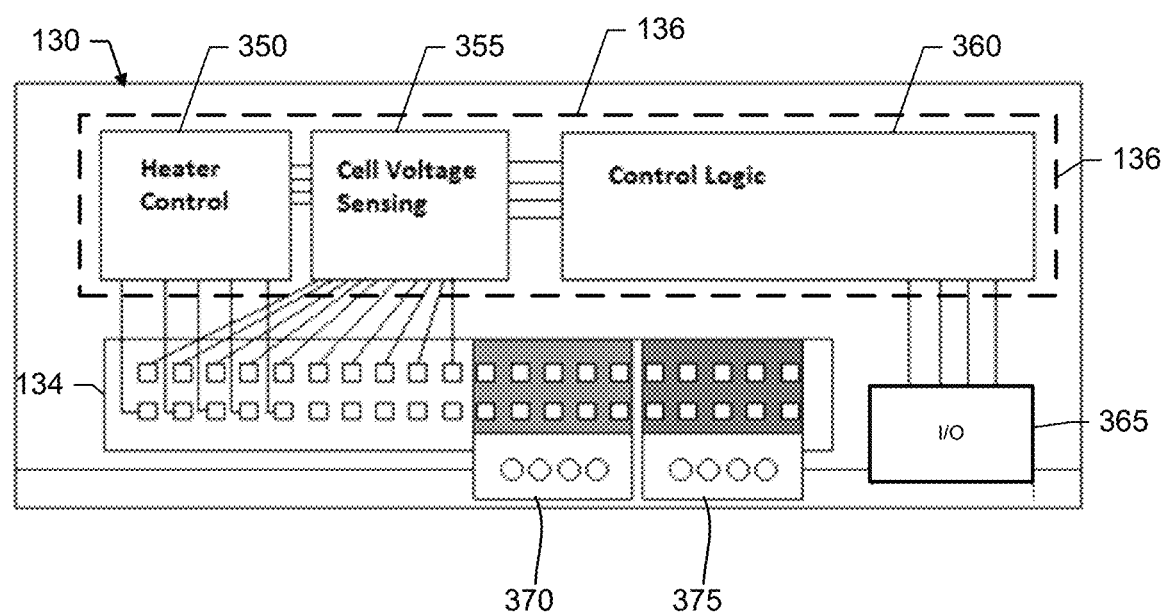
FIG. 3B is an illustration of a control board of the battery pack.
Figure 3A:
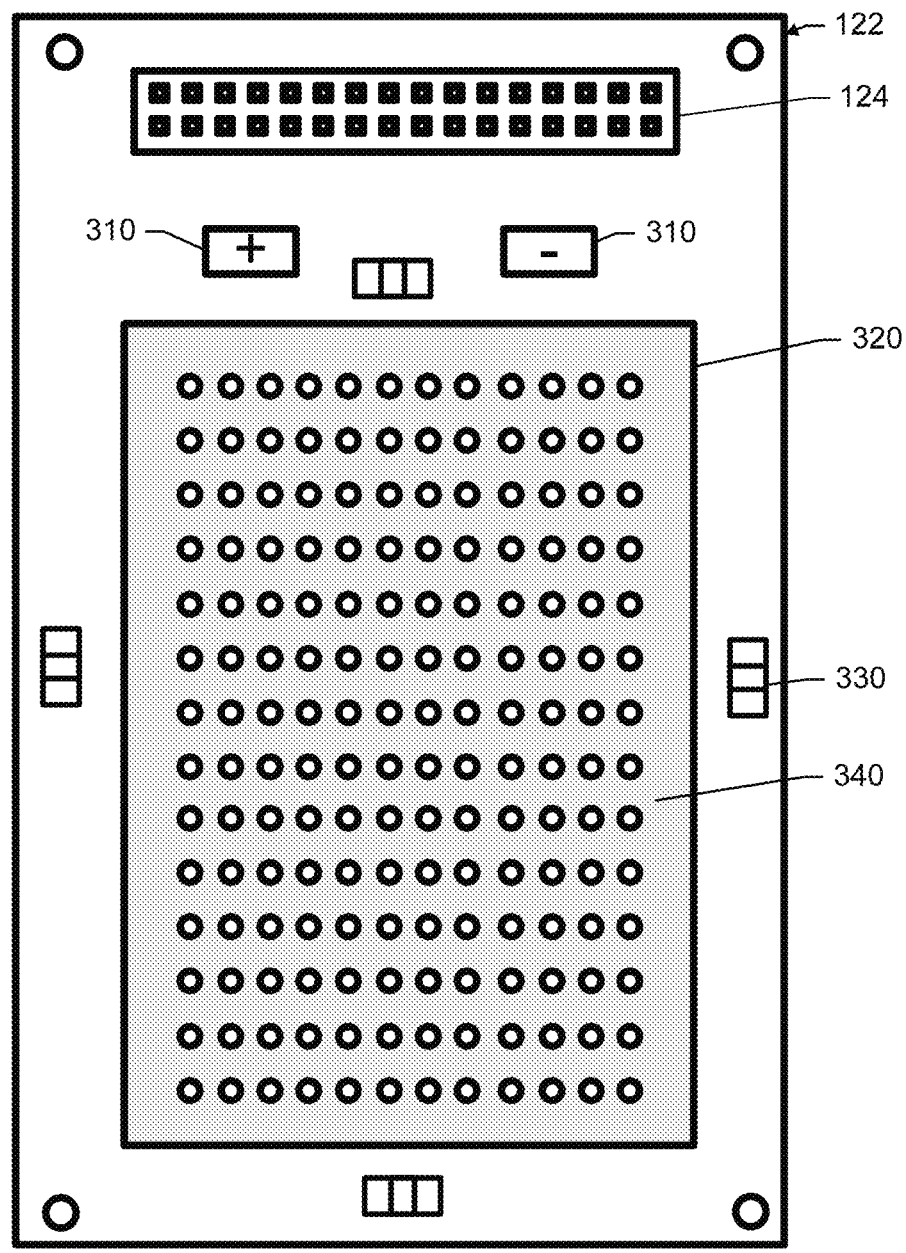
FIG. 3A is an illustration of a circuit board for a battery-board assembly of the battery pack.

Reference is made to FIG. 3A, which illustrates an example of a circuit board 122 for the battery pack 100. Battery cell terminals 220 configured as tabs are electrically connected to cell pads 310 on the circuit board 122. For instance, the battery cell terminals 220 may be soldered to the cell pads 310. The cell pads 310 are electrically connected to pins of the connector 124 (for example, by traces on the circuit board 122). The battery cell terminals 220 may be soldered straight down on the cell pads 310. This eliminates flexing at the battery terminals 220, which reduces the amount of heat stress on the battery cell terminals 220.

A flat side of the battery cell 126 is secured to a mounting area 320 of the circuit board 122. For instance, the battery cell 126 may be adhesively bonded to the mounting area 320, or it may be held to the circuit board 122 by a frame, etc. The battery cell 126 may cover at least half of the side of the circuit board 122.

At least one heating element 330 is mounted to the circuit board 122 outside of the mounting area 320. In the example of FIG. 3A, four heating elements 330 are mounted about a perimeter of the mounting area 320. (In the example of FIG. 1, only a single heating element 330 is shown per circuit board 122.) The heating elements 330 may include, for example, chip resistors, film heaters, and polyimide film heaters. A switch 477, shown in FIG. 4D as a Field Effect Transistor (FET), connects the heating element 330 to the battery cell 126. When the switch 477 is turned on, the battery cell 126 energizes the heating element 330. The maintenance circuitry 136 sends a control signal to the switch 477 via a communication line. The maintenance circuitry 136 decides when to turn the switch 477 on and off.

The mounting area 320 may be covered partially or entirely with a thermally conductive transfer layer 340. The heating elements 330 are thermally proximate to the transfer layer 340. That is, when the heating elements 330 generate heat, the heat is transferred to the transfer layer 340. The transfer layer 340, which is adjacent the battery cell 126 (best shown in FIG. 1), evenly distributes heat to the battery cell 126. The transfer layer 340 may include a copper plane and via through-holes. The through-holes provide a thermal path between opposite sides of the circuit board 122, which improves heat transfer between battery cells 126.

A battery-board assembly 120 is not limited to a single transfer layer 340 adjacent the battery cell 126 In some instances, transfer layers 340 may be on opposite sides of a circuit board 120, whereby each battery cell 126 is between two transfer layers 340.

Reference is made to FIG. 3B, which illustrates an example of a control board 130. The maintenance circuitry 136 may include a heater control 350, cell voltage sensing 355, and control logic 360. The maintenance circuitry 136 may be turned on and off by a power switch 365.

All cell sense lines may be brought up to the control board 130 via the connectors 124 and 134. Each sense line provides a sense voltage for one for the battery cells 126. The cell voltage sensing 355 may include an analog-to-digital converter for converting the sense voltages to digital values, and sending a serial stream of the digital values to the control logic 360, which monitors the sense voltages of the different battery cells 126.

All heater control lines may be brought up to the control board 130 via the connectors 124 and 134. Under command of the control logic 360, the heater control 350 sends control signals to the switches on the battery-board assemblies 120. In response to these control signals, the switches turn the heating elements 330 on and off.

The connector 134 of the control board 130 also provides positive and negative battery terminals 370 and 375. The battery cells 126 are connected between these battery terminals 370 and 375.

Figure 4A:
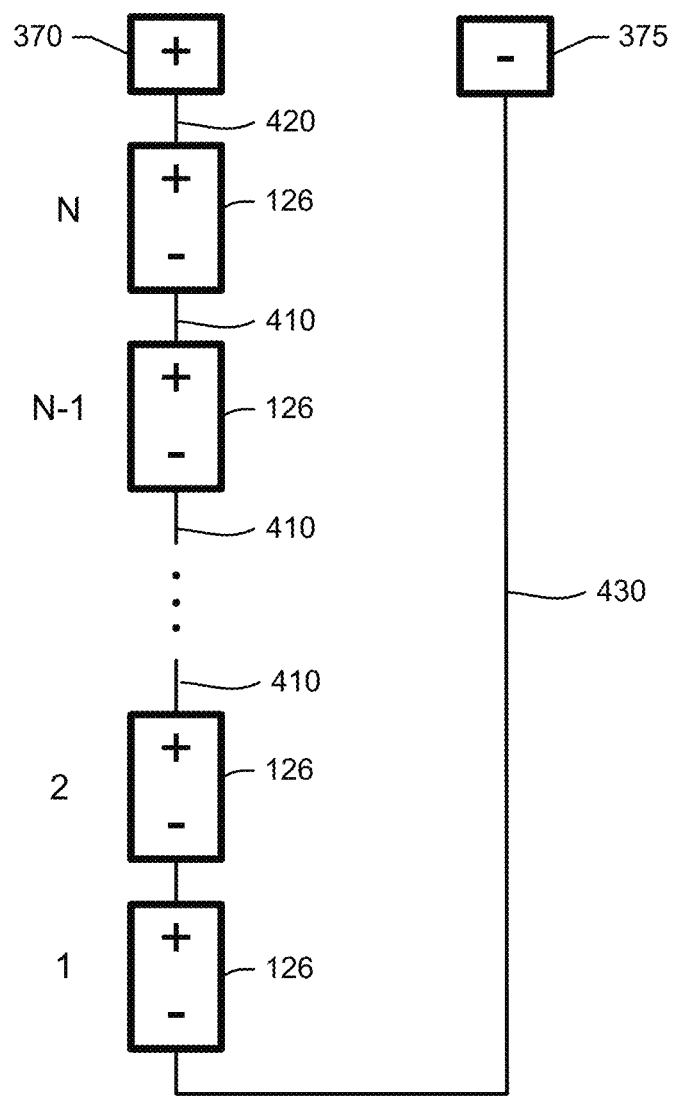
FIG. 4A is an illustration of a serial configuration of battery cells for the battery pack.

Reference is made to FIG. 4A, which illustrates an example of a serial configuration of battery cells 126. The battery cells 126 are provided in a stack 110 of N battery-board assemblies 120, where N>4 (the battery-board assemblies 120 are not illustrated in FIG. 4A). The battery-board assembly 120 closest to the control board 130 will be referred to as the $N^{th}$ battery-board assembly 120, and its battery cell 126 will be referred to as the $N^{th}$ battery cell 126. The battery-board assembly 120 furthest from the control board 130 will be referred to as the $1^{st}$ battery-board assembly 120, and its battery cell 126 will be referred to as the $1^{st}$ battery cell 126.

A first connector 410 connects the positive terminal of the $N^{th}$ battery cell 126 to the positive battery terminal 370 on the control board 130. Second connectors 420 connect the negative terminal of one battery cell 126 to the positive terminal of the next battery cell 126. A third connector 430 connects the negative terminal of the $1^{st}$ battery cell 126 to the negative battery terminal 375 on the control board 130.

Figure 4B:
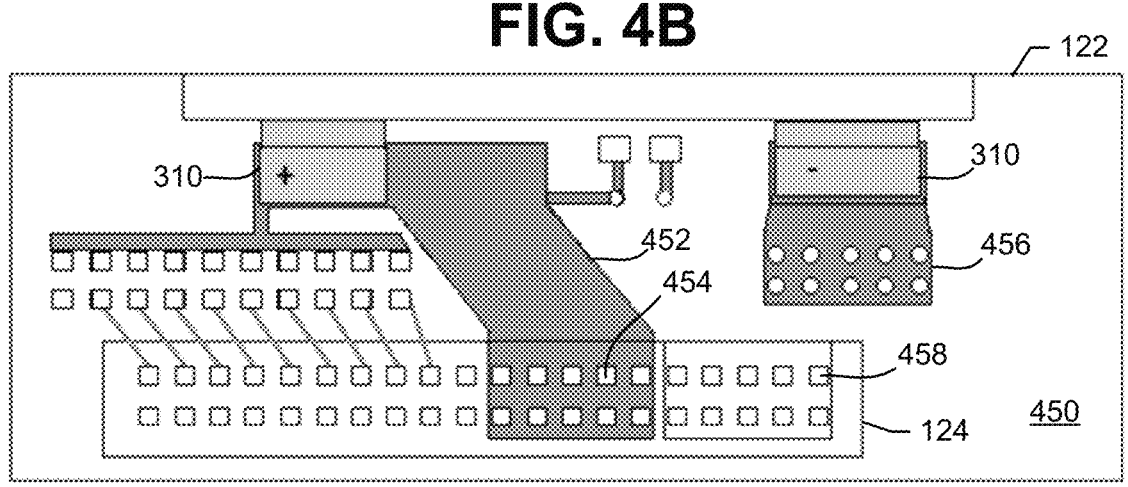
FIGS. 4B, 4C and 4D illustrate examples of battery cell connections formed by circuit board traces and connector pins.
Figure 4C:
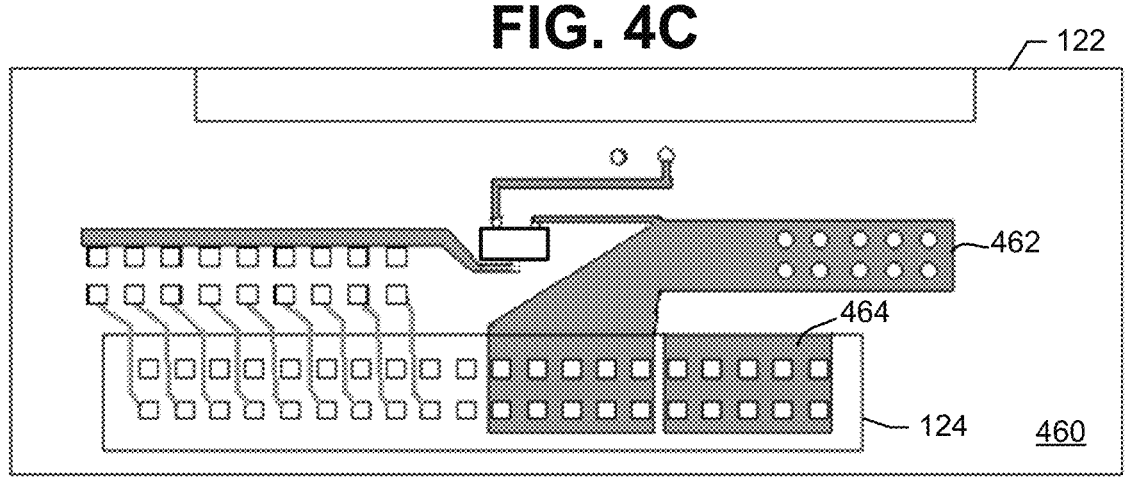
Figure 4D:
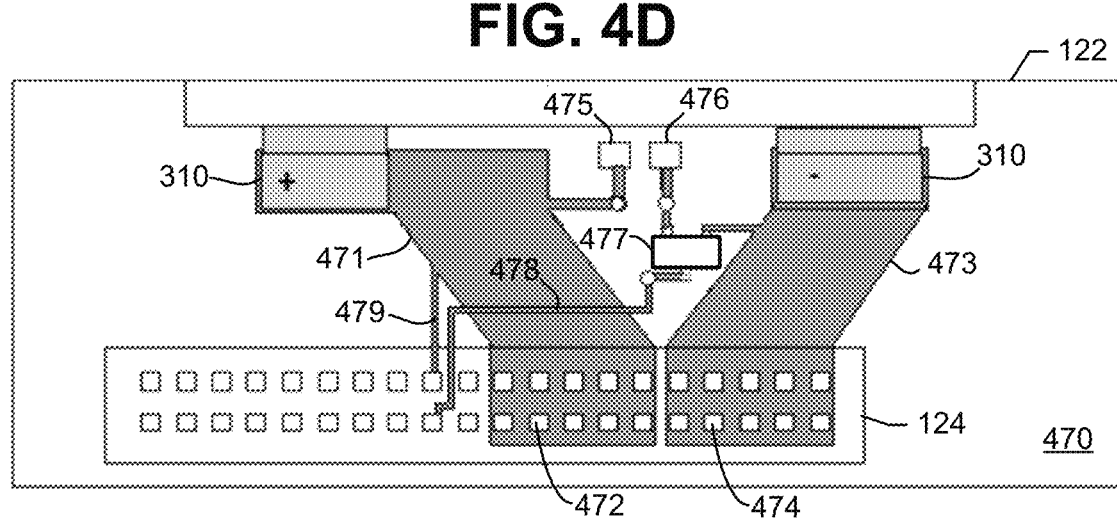

FIGS. 4B to 4D provide an example of how the connectors 410, 420 and 430 are formed from circuit board traces and connector pins. FIGS. 4B and 4C illustrate traces on first and second sides 450 and 460 of the circuit board 122 for each the $2^{nd}$ through $N^{th}$ battery-board assemblies 120. FIG. 4D illustrates traces on a single side 470 of the circuit board 122 for the $1^{st}$ battery-board assembly 120.

Consider the circuit board 122 of the $N^{th}$ battery-board assembly 120. The positive battery terminal 370 on the control board 130 is connected to the positive cell pad 310 of the $N^{th}$ battery-board assembly 120 by a first trace 452 on the first side 450 of the circuit board 122, and also by pins 454 in the connector 124. Thus, the first connector 410 is formed.

A second trace 456 is connected to the negative cell pad 310 of the $N^{th}$ battery-board assembly 120. The second trace 456 is connected to a third trace 462 on the second side 460 of the circuit board 122 of the N$^{th}$ battery-board assembly 120. This third trace 462 is connected to connector pins 454, a first trace 452, and a cell pad 310 in the N−1$^{th}$ battery-board assembly 120. Thus, the second connector 420 is formed by the combination of second and third traces 456 and 462 on the N$^{th}$ battery-board assembly and the pins 454 and the first traces 452 on the N−1$^{th}$ battery-board assembly 120.

Now consider the 1$^{st}$ battery-board assembly 120, which terminates the stack. A fourth trace 471 connects the positive cell pad 310 to pins 472 of the connector 124. This completes the second connector 420 between the 1$^{st}$ and 2$^{nd}$ battery cells 126.

The negative terminal of the 1$^{st}$ battery cell 126 is connected by a fifth trace 473 to pins 474 of the connector 124. These pins 474 are connected to pins 458 (via traces 464) in the connector 124 of the 2$^{nd}$ battery-board assembly 120. The connection to the negative battery terminal 375 on the control board 130 is completed by pins 458 in the connectors 124 of the 2$^{nd}$ through the N$^{th}$ battery-board assemblies 120. Thus, the third connector 430 is formed.

FIG. 4D also illustrates how a heating element 330 may be controlled. The heating element 330 is connected between heater pads 475 and 476. One heater pad 475 is connected to the positive cell pad 310 via the fourth trace 471. The other heater pad 476 is coupled to the negative cell pad 310 via a switch 477. The switch 477 may be an FET. A trace 478 for controlling the switch 477 is connected to a pin of the connector 124. A trace 479 for sensing voltage is connected between the positive battery cell pad 310 and another pin of the connector 124.

FIGS. 4B and 4C illustrate how the other battery-board assemblies 120 may implement the heating control. Both sides 450 and 460 of the circuit board 122 may be used.

Figure 5:
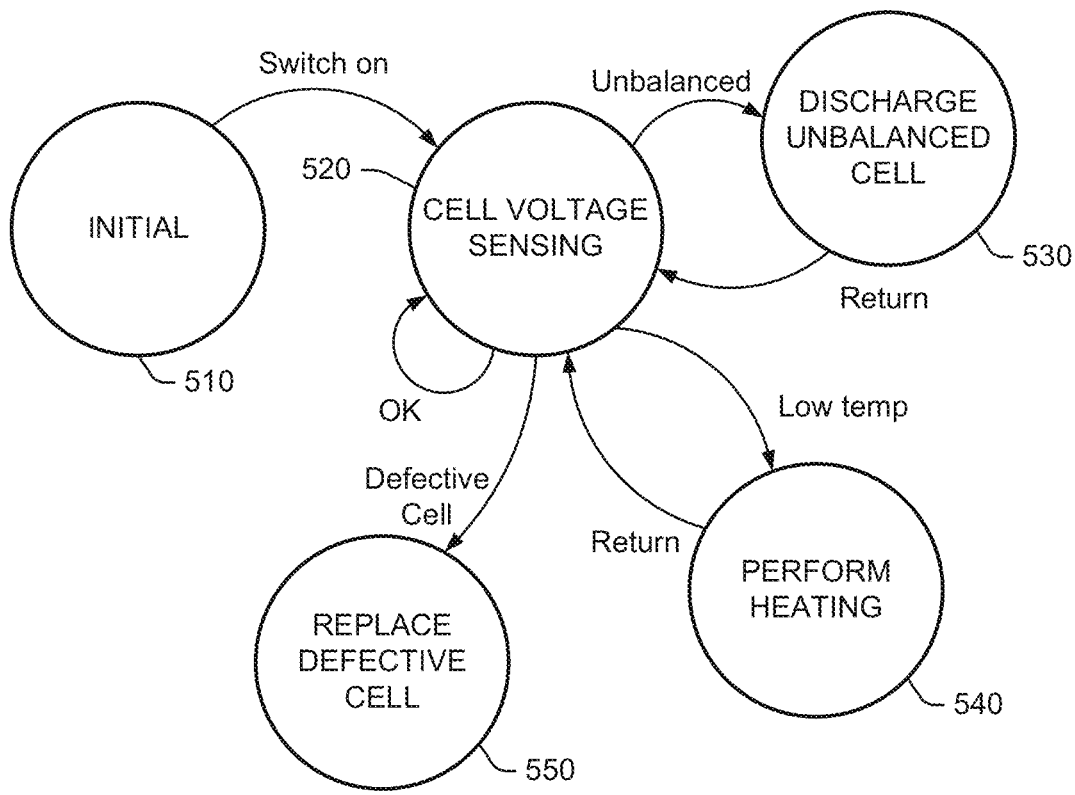
FIG. 5 is an illustration of a method of operating the battery pack of FIG. 1.

Reference is made to FIG. 5, which illustrates a method of operating the battery pack 100. In an initial state (state 510), the maintenance circuitry 136 is turned off, and the battery pack 100 may or may not be connected to a load. Certain factors (e.g., cycling, elevated temperature and aging) may decrease battery performance over time. Maintenance may be performed to prolong the life of the battery pack 100.

When the power switch 365 is turned on, the maintenance circuitry 136 performs cell monitoring (state 520). The cell voltage sensing 355 continually performs voltage sensing of each battery cell 126 and sends digital voltage values to the control logic 360 (state 520). The control logic 360 ensures that the battery pack 100 is charged and discharged within temperature limits. It also determines whether cell balancing should be performed. The control logic 360 also determines whether each battery cell 126 is performing to requirements.

If the control logic 360 determines that the battery cells are unbalanced, it identifies the battery cell 126 that has a higher voltage than the other battery cells 126, and commands the heater control 350 to turn on a switch 477 that causes the identified battery cell 126 to discharge into a heating element 330. After the switch 477 has been turned on, cell monitoring resumes (state 520). When the control logic 360 determines that the identified cell 126 has been brought back into balance, the switch 477 is turned off.

The maintenance circuitry 136 may also include a temperature sensor (e.g., a thermistor) for sensing temperature of the battery pack 100. The sensed temperature is supplied to the control logic 360, which also determines whether the battery pack 100 should be heated.

If the control logic 360 determines that the battery pack 100 should be heated, it may command the heater control 350 to turn on all of the switches 477 on all of the battery-board assemblies 120 (state 540). As a result, each battery cell 126 is discharged through a heating element 330. After the switches 477 have been turned on, cell monitoring resumes (state 520).

The control logic 360 may determine that a battery cell 126 needs to be replaced (state 550). If the control logic 360 makes such a determination, it can communicate the status to external electronics (e.g., another computer or controller) via SPI, UART or I2C interface.

Figure 6:
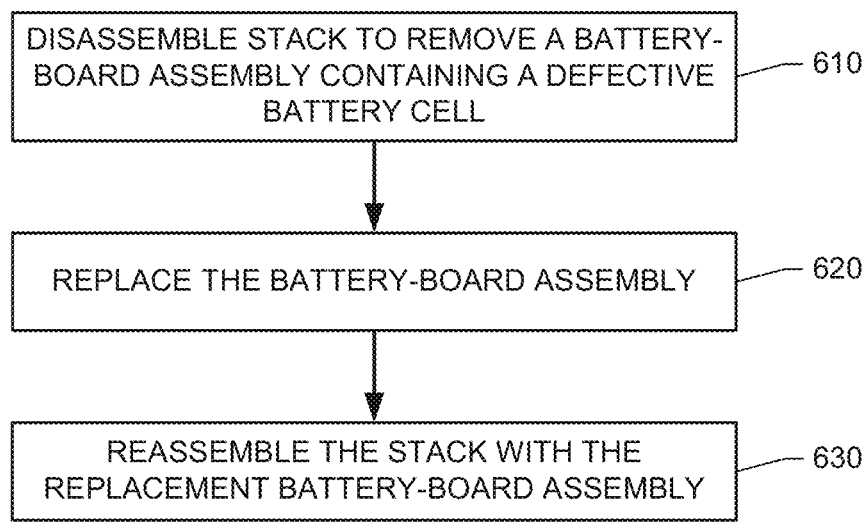
FIG. 6 is an illustration of a method of replacing a battery cell in the battery pack of FIG. 1.

Reference is made to FIG. 6, which illustrates a method of replacing a defective battery cell in the battery pack 100. At block 610, the stack 110 is partially or completely disassembled to remove the battery-board assembly 120 containing the defective battery cell 126. At block 620, that battery-board assembly 120 is replaced with a battery-board assembly 120 having a good battery cell 126. At block 630, the stack 110 is reassembled with the replacement battery-board assembly 120.

Thus, the defective battery cell 126 is replaced quickly. There is no need to unsolder terminals of a defective battery cell and resolder terminals of a replacement battery cell. There is no need to free the defective battery cell 126 from potting compound, and no chance of damaging adjacent battery cells while the defective battery cell 126 is being freed.

The stackable battery-board assemblies 120 provide other advantages. For instance, the battery pack 100 is scalable. Voltage can be increased or decreased by adding or removing battery-board assemblies 120 to or from the stack 110.

Heating is more uniform as the heating elements 330 are proximate to the battery cells 126. Thus, the formation of hot spots is avoided. Cell balancing and heating utilize the same heating elements 330.

Figure 7:
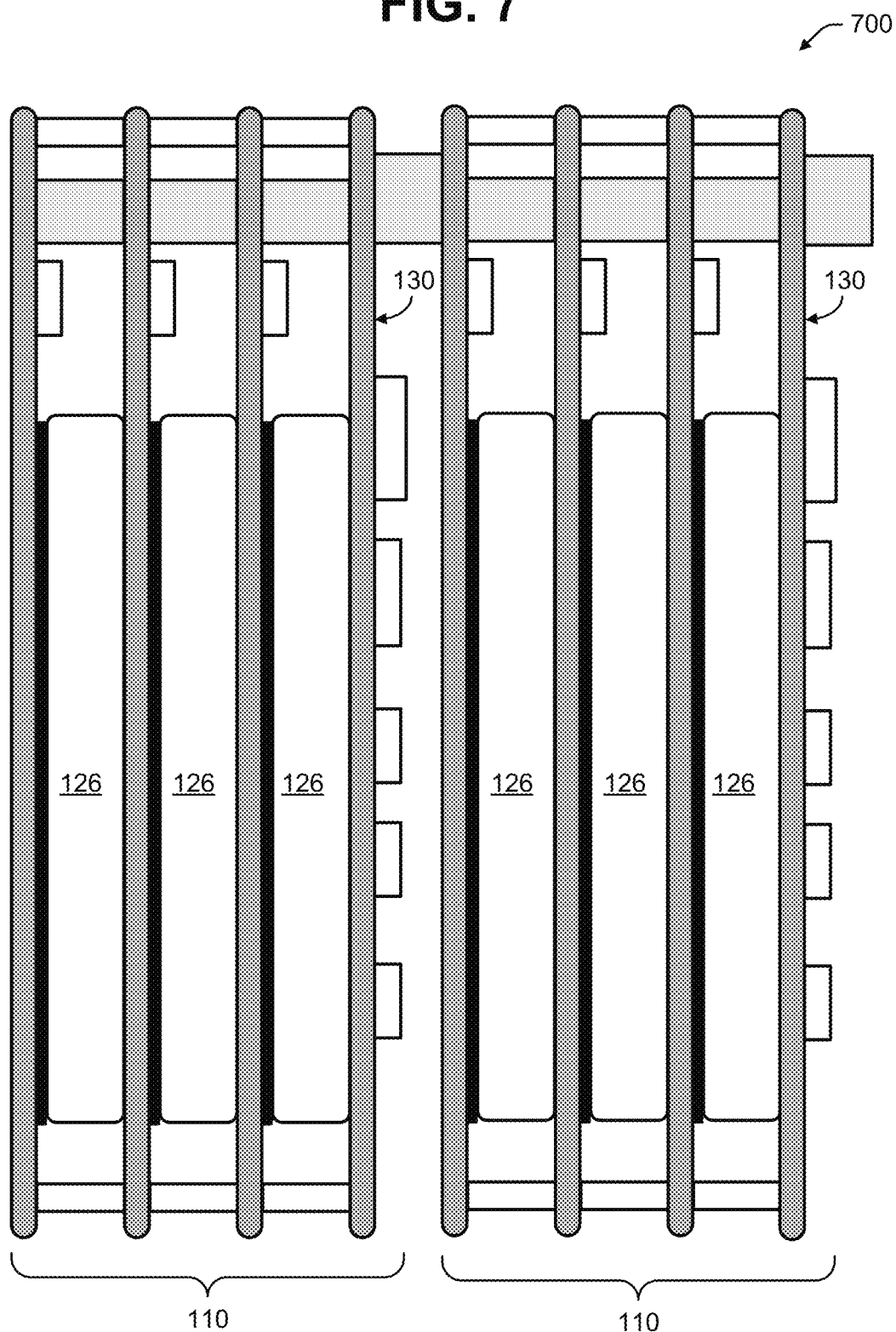
FIG. 7 is an illustration of another battery pack.

Reference is now made to FIG. 7, which shows a battery pack 700 including first and second stacks 110 that are stacked together. Each stack 110 includes a plurality of battery cells 126 connected in a serial configuration. Each stack 110 also includes its own control board 130. Resulting are two batteries, which may provide redundancy, or may be connected in a parallel configuration (e.g., by connecting the positive battery terminals of the control boards 130, and by connecting the negative battery terminals of the control boards 130).

A battery pack herein is not limited to a single battery cell per battery-board assembly 120. For instance, each battery-board assembly 120 may include first and second battery cells.

Figure 8:
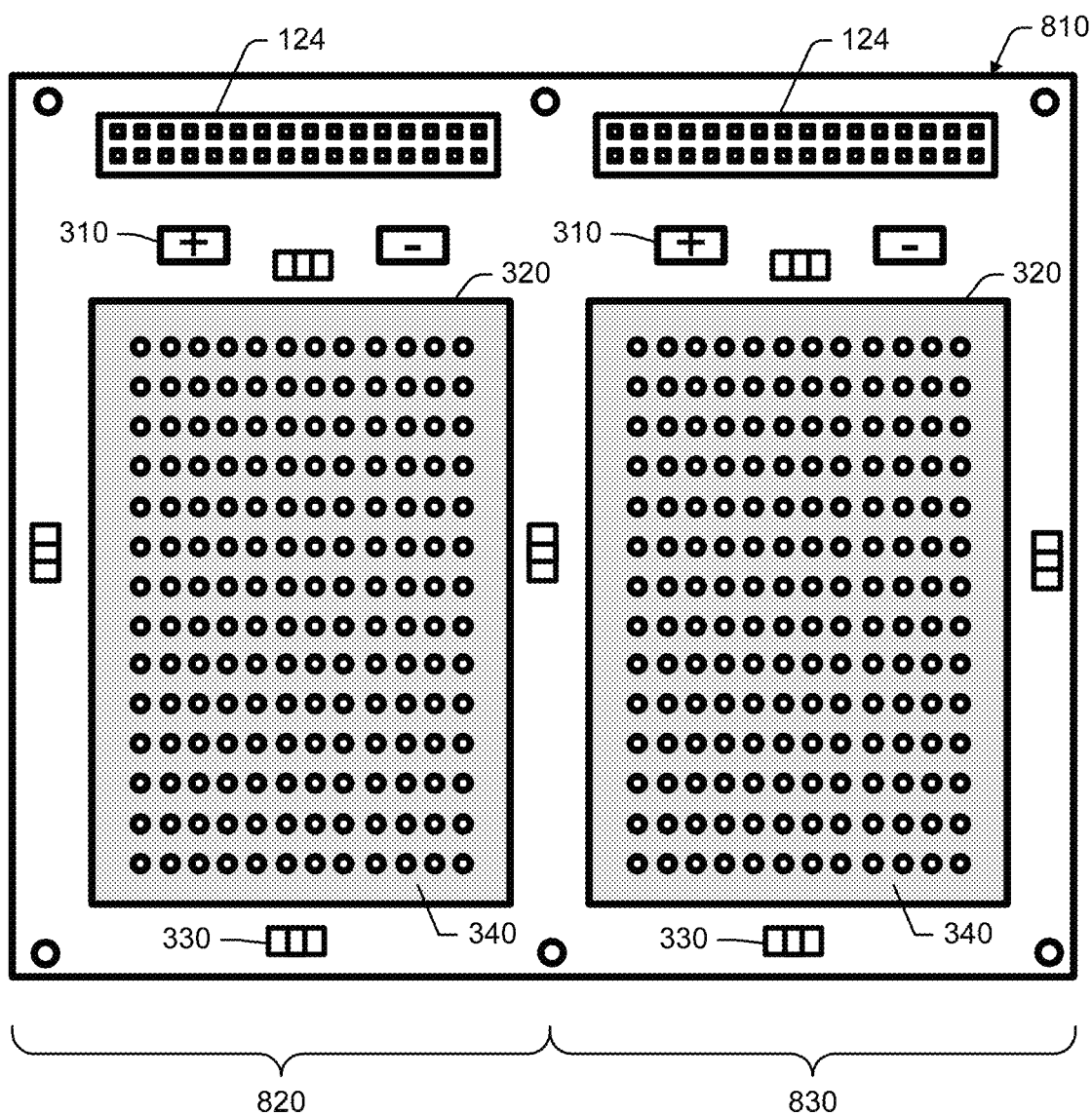
FIG. 8 is an illustration of a battery-board assembly including side-by-side battery cells.

Reference is made to FIG. 8, which illustrates a circuit board 810 that accommodates first and second battery cells 126. The circuit board 810 includes adjacent first and second halves 820 and 830. Each half 820 and 830 includes cell pads 310, a mounting area 320, heating elements 330, and a thermally conductive transfer layer 340. The first and second sides 820 and 830 may share one of the heating elements 330. Each half 820 and 830 also includes a connector 124.

If a plurality of battery-board assemblies 120 containing these circuit boards 810 are stacked, the battery cells 126 on the first halves 820 may be connected in series, and the battery cells 126 on the second halves 830 may be connected in series. Resulting are two batteries, which may provide redundancy or may be connected in a parallel configuration.

The battery pack 100 is not limited to any particular application. However, the battery pack 100 is especially advantageous for satellites and other spacecraft.

Figure 9:
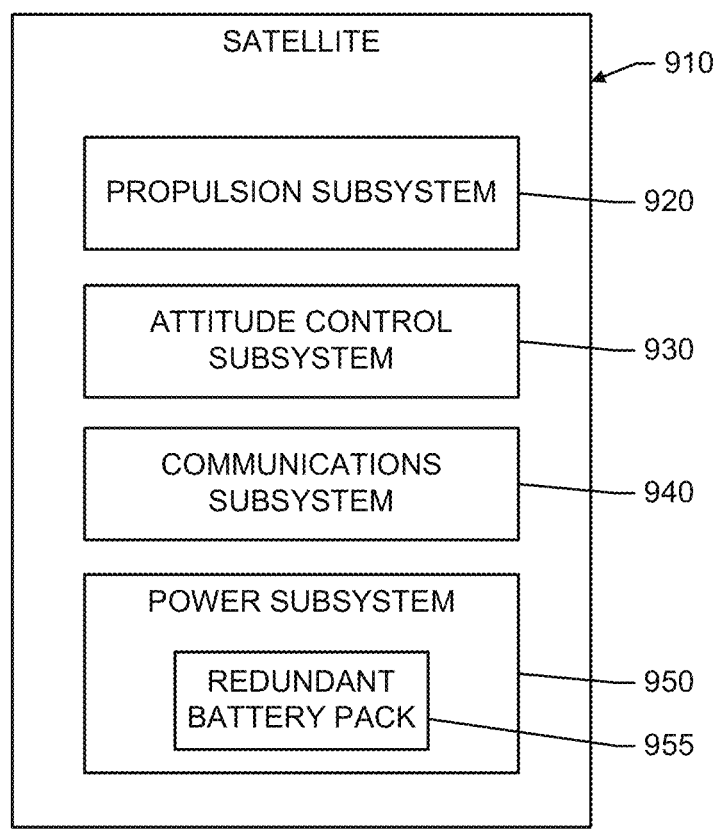
FIG. 9 is an illustration of a satellite including a battery pack.

Reference is made to FIG. 9, which illustrates a satellite 910 including subsystems such as a propulsion subsystem 920, attitude control subsystem 930, communications subsystem 940, and power subsystem 950. The power subsystem 960 includes a redundant battery pack 955. The redundant battery pack 955 may include the battery pack 700 of FIG. 7, or the battery pack 800 of FIG. 8, or two separate battery packs 100 of FIG. 1.

The battery cells 126 of the battery pack 955 may be lithium ion battery cells 126. A first stack of battery cells 126 is connected in a serial configuration, and a second stack of battery cells 126 is connected in a serial configuration. The first stack of battery cells 126 may provide power on a first bus, and the second stack of battery cells 126 may provide power on a second bus.

The battery pack 955 may be unused for an extended period of time between purchase and launch of the satellite 910. During this extended period, a decision may be made to replace a battery cell 126. The battery cell 126 can be replaced quickly, without having to free it from potting compound, without having to unsolder its terminals, and without having to resolder terminals of the replacement battery.

During launch of the satellite 910, the battery pack 955 will be subjected to severe vibrations. With the battery cells 126 clamped between circuit boards 122 and 132, and with the electrical connectors 124 and 134 clamped together, the battery pack 955 can withstand the severe vibrations.

The battery pack 955 also avoids problems caused by external sensor wiring chaffing from vibration experienced during launch. No sense lines or control lines or battery lines are brought outside the pack stack. All sense and control lines are routed through the connectors 124, and all electrical connections are made on the circuit boards 122.

In orbit, the satellite 910 will be exposed to the Earth's varying magnetic field. A battery pack 955 made of non-metallic material avoids problems with magnetic dipoles, which can change attitude and position of the satellite 910.

The invention claimed is:

1. A battery pack comprising:
a control board including a control board circuit board and maintenance circuitry; and
a plurality of battery-board assemblies arranged in a stack, the control board coupled to a first end of the stack, each battery-board assembly including:
a battery-board assembly circuit board,
an electrical connector mounted on the battery-board assembly circuit board, the electrical connector being configured to releasably engage a connector provided on an adjacent battery-board assembly circuit board,
a pair of cell pads mounted on the battery-board assembly circuit board and electrically coupled to the electrical connector, and
a battery cell having a pair of battery cell terminals respectively secured to the pair of cell pads;
wherein, when the plurality of battery-board assemblies are arranged in the stack:
an associated battery cell of the battery-board assembly located at the first end of the stack is sandwiched between the battery-board assembly circuit board of the battery-board assembly located at the first end of the stack and the control board;
the battery cell of each of the plurality of battery-board assemblies other than the battery-board assembly located at the first end of the stack is sandwiched between adjacent battery-board assembly circuit boards;

adjacent battery-board assembly circuit boards are removably interconnected by the connectors; and
the battery-board assembly circuit boards and the connectors electrically connect the battery cells of the plurality of battery-board assemblies.

2. The battery pack of claim 1, wherein the battery cells are connected in a serial configuration.

3. The battery pack of claim 1, wherein each battery cell has a pouch that is non-metallic.

4. The battery pack of claim 1, wherein for each battery-board assembly, the battery cell covers at least half of the side of the battery-board assembly circuit board.

5. The battery pack of claim 1, wherein the battery-board assembly circuit boards and the connectors of the battery-board assemblies form communication lines that enable the maintenance circuitry to communicate with each battery-board assembly.

6. The battery pack of claim 5, wherein the stack includes N battery-board assemblies, where integer N>1; wherein the battery cells are connected in a series configuration; wherein a first terminal of the battery cell in the Nth battery-board assembly is connected to a first battery terminal on the control board by a combination of traces and pins in the Nth battery-board assembly; wherein terminals of consecutive battery cells are connected by a combination of traces and pins on their corresponding battery-board assemblies; and wherein a second terminal of the battery cell on a 1st battery-board assembly is connected to a second battery terminal on the control board by a combination of traces and pins on all of the battery-board assemblies.

7. The battery pack of claim 5, wherein the maintenance circuitry is configured to perform voltage sensing on each battery cell via the communication lines and also to identify any defective battery cells.

8. The battery pack of claim 5, wherein each battery-board assembly includes a heating element proximate to the battery cell, and a switch for connecting the heating element to the battery cell, and wherein the switches are controllable by the maintenance circuitry via the communication lines.

9. The battery pack of claim 8, wherein the maintenance circuitry is configured to turn on all of the switches simultaneously to perform heating.

10. The battery pack of claim 8, wherein the maintenance circuitry is configured to turn on selected switches to perform load balancing.

11. The battery pack of claim 8, wherein the battery-board assembly circuit board of each battery-board assembly further includes a thermally conductive transfer layer sandwiched between the battery-board assembly circuit board and the battery cell, the heating elements thermally proximate to the transfer layer.

12. The battery pack of claim 1, further comprising a second stack of battery-board assemblies, wherein the first and second stacks are stacked together; and wherein the battery cells of each stack are connected in a serial configuration.

13. The battery pack of claim 1, wherein each battery-board assembly further includes a second battery cell adjacent the first battery cell, wherein the first battery cells from all of the battery-board assemblies are connected in series, and wherein the second battery cells from all of the battery-board assemblies are connected in series to form first and second batteries.

14. A method comprising replacing a given battery cell in the battery pack of claim 1, the method including:
disconnecting an electrical connector of the battery-board assembly containing the given battery cell from electrical connectors provided on adjacent battery-board assembly circuit boards, wherein the electrical connector of the given battery cell is configured to releasably engage the electrical connectors provided on the adjacent battery-board assembly circuit boards;

removing from the stack of battery board assemblies, as an integral unit, the battery-board assembly containing the given battery cell and associated battery-board circuit board to which the terminals of the given battery cell are secured;

replacing the battery-board assembly containing the given battery cell with a replacement battery-board assembly having, as an integral replacement unit, a replacement battery-board circuit board, an electrical connector mounted on the replacement battery-board circuit board and configured to releasably engage the electrical connectors provided on the adjacent battery-board assembly circuit boards, and a replacement battery cell with battery cell terminals secured to the replacement battery-board circuit board; and connecting the electrical connector of the replacement battery-board assembly to the electrical connectors provided on adjacent battery-board assembly circuit boards, thereby to reassemble the stack.

15. A method of performing maintenance on the battery pack of claim 1, each battery-board assembly including a heating element, the method comprising discharging all of the battery cells through the heating elements to heat the battery pack.

16. The method of claim 15, wherein the maintenance further includes discharging a select battery cell through a heating element to perform load balancing.

17. A battery pack comprising a stack of a plurality of battery-board assemblies and a control board, each of the plurality of battery-board assemblies including:
 a battery-board assembly circuit board,
 an electrical connector mounted on the battery-board assembly circuit board, the electrical connector being configured to removably engage a connector provided on an adjacent battery-board assembly circuit board,
 a pair of cell pads mounted on the battery-board assembly circuit board and electrically coupled to the electrical connector,
 a battery cell mounted on the battery-board assembly circuit board and having a pair of battery cell terminals respectively secured to the pair of cell pads, and
 at least one heating element proximate the battery cell, and the control board including a control board circuit board and maintenance circuitry, the control board coupled to a first end of the stack, wherein, when the plurality of battery-board assemblies are assembled in the stack:
 an associated battery cell of the battery-board assembly located at the first end of the stack is sandwiched between the battery-board assembly circuit board of the battery-board assembly located at the first end of the stack and the control board;
 the battery cell of each of the plurality of battery-board assemblies other than the battery-board assembly located at the first end of the stack is sandwiched between adjacent battery-board assembly circuit boards;
 adjacent battery-board assembly circuit boards are removably interconnected by the connectors;
 the battery-board assembly circuit boards and the connectors electrically connect the battery cells of the plurality of battery-board assemblies in a serial configuration; and
 traces on the battery-board assembly circuit boards and the control board circuit board and pins of the connectors form communication lines that enable the maintenance circuitry to communicate with each battery-board assembly.

18. The battery pack of claim 17, wherein each battery-board assembly includes a switch connected between the heating element and the battery cell, the switch communicating with the maintenance circuitry via the communication lines; and wherein the maintenance circuitry includes logic configured to turn on all of the switches for battery pack heating and turn on select switches for load balancing.

19. The battery pack of claim 17, wherein the control board is electrically and communicatively coupled to each of the battery-board assemblies only through the traces on the battery-board assembly circuit boards and the control board circuit board, and pins of the connectors connecting adjacent battery-board assembly circuit boards.

20. The battery pack of claim 17, wherein the battery-board assembly circuit boards and the connectors of the battery-board assemblies form communication lines that enable the maintenance circuitry to communicate with each battery-board assembly.

* * * * *